United States Patent
Van Mourik

(10) Patent No.: US 6,215,468 B1
(45) Date of Patent: Apr. 10, 2001

(54) CIRCUIT FOR CONVERTING AN 8-BIT INPUT VIDEO SIGNAL INTO A 10-BIT GAMMA CORRECTED OUTPUT VIDEO SIGNAL

(75) Inventor: Johannes G. R. Van Mourik, Knoxville, TN (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/191,842

(22) Filed: Nov. 13, 1998

(51) Int. Cl.[7] .................................................. G09G 5/10
(52) U.S. Cl. ............................................. 345/147; 345/155
(58) Field of Search ................................... 345/147, 155; 348/674, 678, 254

(56) References Cited

U.S. PATENT DOCUMENTS 5,764,216 * 6/1998 Tanaka et al. ........................ 345/147
5,917,959 * 6/1999 Kagawa et al. ...................... 382/276

FOREIGN PATENT DOCUMENTS

| 07182507 | 7/1995 | (EP) | ................................ | G06T/5/00 |
| 9209065 | 5/1992 | (WO) | ............................... | G09G/3/34 |
| 9214336 | 8/1992 | (WO) | ............................ | H04N/5/202 |

* cited by examiner

Primary Examiner—Matthew Luu
Assistant Examiner—Motilewa Good-Johnson
(74) Attorney, Agent, or Firm—Edward W. Goodman

(57) ABSTRACT

Flat panel displays, particularly plasma display panels (PDP's) have a linear response to the luminance in an applied video signal. However, all video and graphic data sources assume that the information will be displayed on a CRT-like device which has a non-linear response. Without compensation, the video signal applied to the PDP appears pale with little color saturation. In addition, some PDP's utilize a 10-bit digital input while digital video signal processing is carried out using 8 bits. Hence, a circuit is provided for gamma correcting and for converting the 8-bit video signal into a 10-bit output signal for application to the PDP. The circuit takes into consideration that human vision has a non-linear perceptual response to luminance in the gamma correction and 8-bit to 10-bit conversion of the video signal.

8 Claims, 1 Drawing Sheet

CIRCUIT FOR CONVERTING AN 8-BIT INPUT VIDEO SIGNAL INTO A 10-BIT GAMMA CORRECTED OUTPUT VIDEO SIGNAL

BACKGROUND OF THE INVENTION

1. Field of the Invention

The subject invention relates to the display of color video signals, and more particularly, to displaying color video signals on a linear display.

All video and data graphic sources assume that the information will be displayed on a CRT-like device, i.e., a display device with a non-linear luminance output/electrical input function. The assumed function is the so-called gamma function, where $V_{OUT}=V_{IN}^{\gamma}$, where $\gamma=2.2$–$2.8$. However, various flat displays, including plasma display panels (PDP's), have a linear response, i.e., $\gamma=1.0$. If this discrepancy is not corrected, the displayed picture has a pale appearance with little color saturation.

2. Description of the Related Art

Typically, digital video signal processing is carried out using 8 bits. However, some PDP's utilize a 10-bit digital input. A gamma look-up table can be used to interface between the 8-bit processing and the 10-bit PDP. Hence, the look-up table uses a list of 256 10-bit values for each color, each of these values being corrected with respect to gamma. The most common way of realizing the look-up table is by using a (P)ROM or a RAM. Since the typical width of RAM and ROM is 8 bits, it is necessary to use 2 8-bit ROMs or RAMs in parallel to store the look-up table.

SUMMARY OF THE INVENTION

It is an object of the invention to store the look-up table in a more economical fashion. This object is achieved in a circuit for converting an 8-bit input video signal into a 10-bit gamma corrected output video signal, said circuit comprising input means for receiving the 8-bit input video signal; means for gamma correcting and for converting the 8-bit input video signal into a 10-bit gamma corrected video signal; and output means for supplying the 10-bit gamma corrected video signal.

In a particular embodiment of the invention, the gamma correcting and converting means comprises a look-up table containing 8-bit gamma table values; and means for converting the 8-bit gamma table values into the 10-bit gamma corrected video signal.

One approach in generating the 8-bit gamma table values is to use a direct conversion where:

$$V_{OUT}=V_{IN}^{\gamma} \quad (1)$$

in which the 8-bit gamma table values are actually 8-bit gamma corrected video signal values, and then linearly converting the 8-bit gamma corrected video signal values into 10-bit gamma corrected video signal values.

However, Applicant notes that human vision has a non-linear perceptual response to luminance. The perceptual response to luminance is called Lightness. In an approximation, this response is logarithmic, i.e., the human eye is sensitive to ratios of luminance rather than absolute values. Hence, the human eye can distinguish luminance levels down to 1%. Relating this to the 10-bit PDP, the human eye can clearly distinguish the differences between, e.g., 0 and 1 and 2; just barely distinguish the difference between 100 and 101, but not the difference between 1015 and 1023. Hence, linear coding of the PDP input is not optimal, but rather, for low luminance levels, 10 bits, or preferably 12 bits are needed, while for high luminance levels, 8 bits are more than sufficient.

Using the Lightness theory, Applicant has found that 10 bits are not needed for the full range of the PDP; just for the lower part of the range. On the other hand, since $\gamma=2.2$–$2.8$, it is known that $\gamma>1$. Hence, for the lower input values, the most significant bits (MSB's) of the output are always 0. Based on these facts, instead of 8-bit gamma corrected signal values, 8-bit gamma table values $V_{CLUT}$ may be generated by the following formulae:

$$V_{10}(i)=4*i^{\gamma} \text{ for } i=0 \text{ to } 255; \quad (2)$$

$$V_{CLUT}(i)=V_{10}(i), \text{ for } i=0 \text{ to } 63; \quad (3)$$

$$V_{CLUT}(i)=V_{10}(i)/2, \text{ for } i=64 \text{ to } 127; \text{ and} \quad (4)$$

$$V_{CLUT}(i)=V_{10}(i)/4, \text{ for } i=128 \text{ to } 255. \quad (5)$$

Correspondingly, the converting means constructs the 10-bit gamma corrected output values $V_{OUT}(i)$ by shifting the look-up table output depending on the MSB's of the input signal as follows:

| $V_{IN}(7, 6)$ | $V_{OUT}(9\text{-}0)$ |
| --- | --- |
| 00 | 0, 0, $V_{CLUT}(7\text{-}0)$ |
| 01 | 0, $V_{CLUT}(7\text{-}0)$, 0 |
| 10 | $V_{CLUT}(7\text{-}0)$, $V_{CLUT}(7)$, $V_{CLUT}(6)$ |
| 11 | $V_{CLUT}(7\text{-}0)$, $V_{CLUT}(7)$, $V_{CLUT}(6)$ |

The basic assumption is that $\gamma>1.0$, therefore $V_{OUT}\leq V_{IN}$. If $V_{IN}(7, 6)=00$, then $V_{OUT}(9, 8)=00$ and these bits do not need to be coded. Similarly, if $V_{IN}(7, 6)=01$, then $V_{OUT}(9, 8)\leq 01$, so $V_{OUT}(9)=0$ and this bit does not need to be coded. Hence, for $V_{IN}\leq 63$, the full 10-bit range of the PDP is used; for $64\leq V_{IN}\leq 127$, 9 bits are used; and for $V_{IN}\geq 128$, 8 bits are used. The extension by $V_{CLUT}(7)$, $V_{CLUT}(6)$ rather than 0, 0, in the latter case is theoretical so that a continuous range up to the maximum PDP input of 1023 is achieved.

Since the circuit is to be used in a color system, the look-up table contains three such tables, one for each color signal.

In addition to correcting for gamma, it is desirable that the stored values in the tables take into consideration white point correction. To this end, the above formula (1) is modified for each color:

$$V_{10}(i)=4*GAIN*i^{65} \text{ for } i=0 \text{ to } 255, \quad (6)$$

where GAIN is a factor equal to or less than 1. Hence, for each color, the GAIN factor is adjusted to achieve a desired white point.

BRIEF DESCRIPTION OF THE DRAWING

With the above and additional objects and advantages in mind as will hereinafter appear, the invention will be described with reference to the accompanying drawing, in which.

DESCRIPTION OF THE PREFERRED EMBODIMENTS

Figure 1:
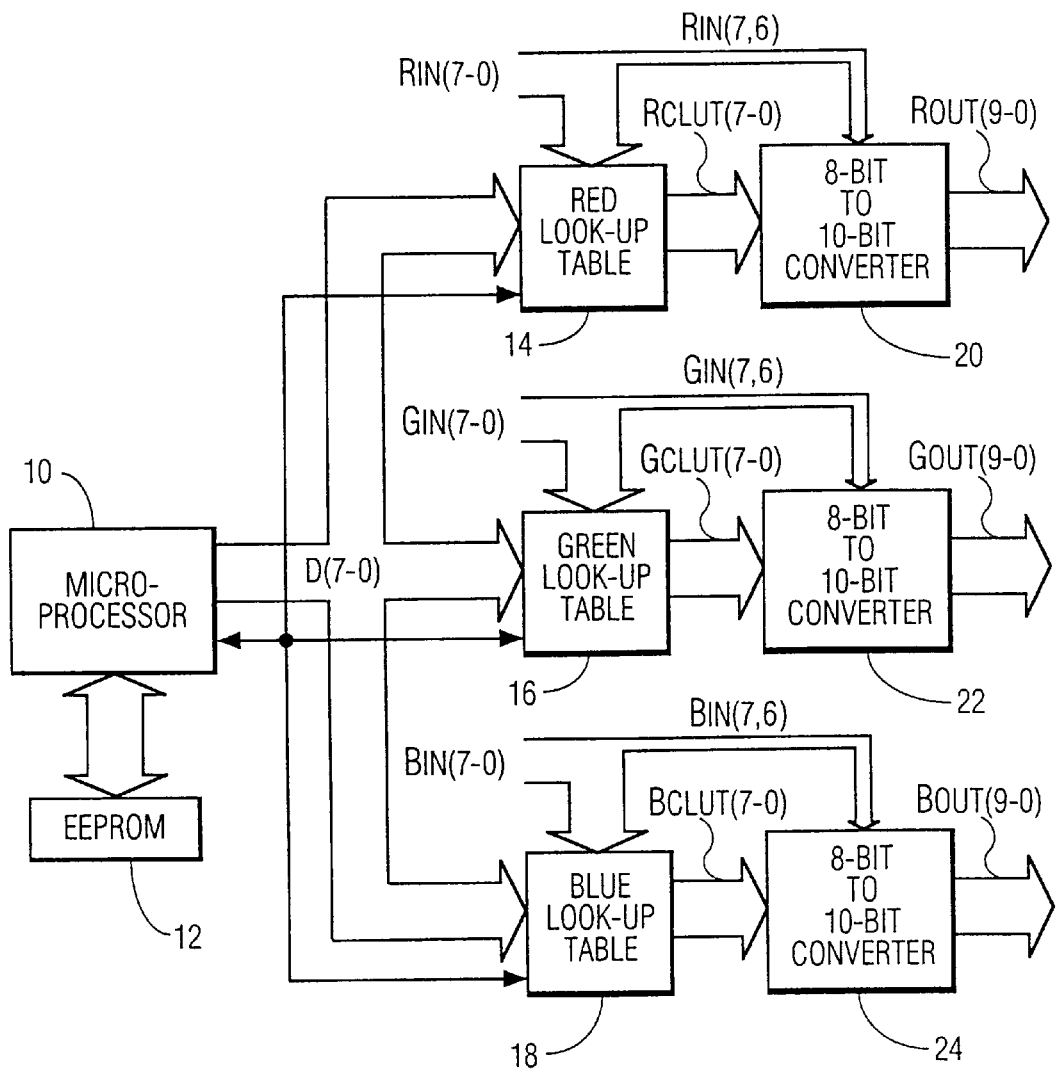
FIG. 1 is a block diagram of the circuit of the invention.

In FIG. 1, a microprocessor 10 is shown which stores data in and retrieves data from an electrically erasable programmable read-only memory (EEPROM) 12. The microprocessor 10 has data outputs D(7-0) for applying data to look-up tables 14, 16 and 18, one for each of the primary colors Red, Green and Blue, and a control input/output line also connected to the look-up tables 14, 16 and 18. Each of the look-up tables 14, 16 and 18 has an 8-bit input for receiving an 8-bit input color signal $R_{IN}(7-0)$, $G_{IN}(7-0)$, $B_{IN}(7-0)$, and an 8-bit output for supplying an 8-bit gamma table signal $R_{CLUT}(7-0)$, $G_{CLUT}(7-0)$, $B_{CLUT}(7-0)$. The 8-bit output from the look-up table 14 is connected to an 8-bit input of an 8-bit to 10-bit converter 20 which has an additional 2-bit control input connected to receive the two most significant bits (MSB's) $R_{IN}(7,6)$ of the 8-bit input Red signal $R_{IN}(7-0)$. Similarly, the 8-bit output from the look-up table 16 is connected to an 8-bit input of an 8-bit to 10-bit converter 22 which has an additional 2-bit control input connected to receive the two MSB's $G_{IN}(7, 6)$ of the 8-bit input Green signal $G_{IN}(7-0)$. Finally, the 8-bit output from the look-up table 18 is connected to an 8-bit input of an 8-bit to 10-bit converter 24 which has an additional 2-bit control input connected to receive the two MSB's $B_{IN}(7,6)$ of the 8-bit input Blue signal $B_{IN}(7,6)$.

The look-up tables 14, 16 and 18 may be 3 separate 8-bit RAM's or a single 8-bit RAM having 3 sets of data inputs and data outputs.

The microprocessor 10 calculates the gamma look-up table values for each of the three primary colors and stores these values in the EEPROM 12 for three different white points in accordance with the formulae (shown only for the Red color signal):

$$R_{10}(i)=4*GAIN*i^\gamma \text{ for } i=0 \text{ to } 255, \quad (6)$$

where GAIN≦1, and is adjusted between the three color signals to set the white point;

$$R_{CLUT}(i)=R_{10}(i), \text{ for } i=0 \text{ to } 63; \quad (3)$$

$$R_{CLUT}(i)=R_{10}(i)/2, \text{ for } i=64 \text{ to } 127; \text{ and} \quad (4)$$

$$R_{CLUT}(i)=R_{10}(i)/4, \text{ for } i=128 \text{ to } 255. \quad (5)$$

The calculation and storing steps are performed once by the microprocessor 10, for example, during set up. Alternatively, the calculation and storing steps may be performed during start up or because of a change in color temperature setting.

Table 1 shows a chart of sample values for the Red color signal for i, $R_{10}(i)$ (decimal), $R_{10}(i)$ (binary), $R_{CLUT}(i)$ (binary), $R_{OUT}(i)$ (binary), and $R_{OUT}(i)$ (decimal).

TABLE 1

GAMMA = 2.2, GAIN = 1.0

| i DECIMAL | $R_{10}(i)$ DECIMAL | $R_{10}(i)$ BINARY | $R_{CLUT}(i)$ BINARY | $R_{OUT}(i)$ BINARY | $R_{OUT}(i)$ DECIMAL |
|---|---|---|---|---|---|
| 0 | 0 | 0000000000 | 00000000 | 0000000000 | 0 |
| 1 | 0 | 0000000000 | 00000000 | 0000000000 | 0 |
| 62 | 46 | 0000101110 | 00101110 | 0000101110 | 46 |
| 63 | 47 | 0000101111 | 00101111 | 0000101111 | 47 |
| 64 | 49 | 0000110001 | 00011000 | 0000110000 | 48 |
| 65 | 51 | 0000110011 | 00011001 | 0000110010 | 50 |
| 126 | 217 | 0011011001 | 01101100 | 0011011000 | 216 |

TABLE 1-continued

GAMMA = 2.2, GAIN = 1.0

| i DECIMAL | $R_{10}(i)$ DECIMAL | $R_{10}(i)$ BINARY | $R_{CLUT}(i)$ BINARY | $R_{OUT}(i)$ BINARY | $R_{OUT}(i)$ DECIMAL |
|---|---|---|---|---|---|
| 127 | 221 | 0011011101 | 01101110 | 0011011100 | 220 |
| 128 | 225 | 0011100001 | 00111000 | 0011100000 | 224 |
| 129 | 228 | 0011100100 | 00111001 | 0011100100 | 228 |
| 190 | 535 | 1000010111 | 10000101 | 1000010110 | 534 |
| 191 | 542 | 1000011110 | 10000111 | 1000011110 | 542 |
| 192 | 548 | 1000100100 | 10001001 | 1000100110 | 550 |
| 193 | 554 | 1000101010 | 10001010 | 1000101010 | 554 |
| 252 | 997 | 1111100101 | 11111001 | 1111100111 | 999 |
| 253 | 1005 | 1111101101 | 11111011 | 1111101111 | 1007 |
| 254 | 1014 | 1111110110 | 11111101 | 1111110111 | 1015 |
| 255 | 1023 | 1111111111 | 11111111 | 1111111111 | 1023 |

During operation, i.e., after the gamma look-up table have been calculated and stored in EEPROM 12, depending on the desired white point, the microprocessor 10 reads the appropriate gamma look-up table values stored in the EEPROM 12 and loads these value into the look-up tables 14, 16 and 18.

On application of 8-bit input signals $R_{IN}(7-0)$, $G_{IN}(7-0)$ and $B_{IN}(7-0)$, the look-up tables 14, 16 and 18 generate the gamma table signals $R_{CLUT}(7-0)$, $G_{CLUT}(7-0)$ and $B_{CLUT}(7-0)$, respectively. The 8-bit to 10-bit converters 20, 22 and 24 convert the 8-bit gamma table signals from the color look-up tables 14, 16 and 18, respectively, in accordance with the following Table 2:

TABLE 2

| $R_{IN}(7, 6)$ | $R_{OUT}(9-0)$ |
|---|---|
| 00 | 0, 0, $R_{CLUT}(7-0)$ |
| 01 | 0, $R_{CLUT}(7-0)$, 0 |
| 10 | $R_{CLUT}(7-0)$, $R_{CLUT}(7)$, $R_{CLUT}(6)$ |
| 11 | $R_{CLUT}(7-0)$, $R_{CLUT}(7)$, $R_{CLUT}(6)$ |

The invention may be used for other functions and other combinations of numbers where the output value of the correction table is less than or equal to the input value of the correction table, and where the number of output bits is greater than the number of input bits.

In addition, the invention may be used with display types other than PDP's. For example, the invention is particularly useful for the Digital Mirror Device (DMD), in which also γ=1.

Furthermore, the invention may be adapted for devices where the output value of the correction table is greater than or equal to the input value of the correction table, for example, liquid crystal displays (LCD's) in which γ≅3 to 4.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for converting an 8-bit input video signal into a 10-bit gamma corrected output video signal, said circuit comprising:

input means for receiving the 8-bit input video signal;

means for gamma correcting and converting the 8-bit input video signal into a 10-bit gamma corrected video signal; and output means for supplying the 10-bit gamma corrected video signal, wherein said gamma correcting and converting means comprises:

8-bit look-up table means containing 8-bit gamma table values in accordance with the equation $V_{OUT}(i) = V_{IN}(i)^\gamma$, for $i=0$ to 255, where $V_{OUT}$ is a 8-bit gamma corrected video signal, $V_{IN}$ is the 8-bit input video signal, and $\gamma$ is gamma; and means for linearly converting the 8-bit gamma corrected video signal into said 10-bit gamma corrected video signal.

2. A circuit for converting an 8-bit input video signal into a 10-bit gamma corrected output video signal, said circuit comprising:

input means for receiving the 8-bit input video signal;

means for gamma correcting and converting the 8-bit input video signal into a 10-bit gamma corrected video signal; and output means for supplying the 10-bit gamma corrected video signal, wherein said gamma correcting and converting means comprises:

look-up table means containing 8-bit gamma table values, said 8-bit gamma table values being generated by the following formulae:

$V_{10}(i) = 4 * i^\gamma$ for $i=0$ to 255

$V_{CLUT}(i) = V_{10}(i)$, for $i=0$ to 63;

$V_{CLUT}(i) = V_{10}(i)/2$, for $i=64$ to 127;

and $V_{CLUT}(i) = V_{10}(i)/4$, for $i=128$ to 255;

and means for converting said 8-bit gamma table values into said 10-bit gamma corrected video signal.

3. A circuit as claimed in claim 2, wherein said means for converting forms said 10-bit gamma corrected video signal in accordance with the following table:

| $V_{IN}(7, 6)$ | $V_{OUT}(9\text{-}0)$ |
|---|---|
| 00 | 0, 0, $V_{CLUT}(7\text{-}0)$ |
| 01 | 0, $V_{CLUT}(7\text{-}0)$, 0 |
| 10 | $V_{CLUT}(7\text{-}0)$, $V_{CLUT}(7)$, $V_{CLUT}(6)$ |
| 11 | $V_{CLUT}(7\text{-}0)$, $V_{CLUT}(7)$, $V_{CLUT}(6)$. |

4. A circuit as claimed in claim 3, said circuit being used in a color television system having three 8-bit color signals for conversion into three 10-bit color signals, wherein said look-up table means contains separate 8-bit gamma table values for each of said three 8-bit color signals, and said means for converting includes separate converting means for said separate 8-bit gamma table values, respectively.

5. A circuit as claimed in claim 4, wherein said separate 8-bit gamma table values are adjusted with respect to each of said three 8-bit color signals to compensate for a desired color temperature.

6. A circuit as claimed in claim 5, wherein said adjustment is accomplished by multiplying the values of $V_{10}(i)$ for each color signal by a factor GAIN, where GAIN $\leq 1.0$.

7. A circuit as claimed in claim 6, wherein said look-up table means contains 8-bit gamma table values for each of the three color signal, for three different white color temperatures.

8. A circuit as claimed in claim 7, wherein said look-up table means comprises:

a microprocessor for calculating the values for said 8-bit gamma table values for each of said color signals and for each of said white color temperatures;

an electrically erasable programmable read only memory (EEPROM) coupled to said microprocessor for storing said calculated 8-bit gamma table values; and three RAM memories corresponding, respectively, to said three color signals, each of said RAM memories having a data input coupled to said microprocessor for receiving, under control of said microprocessor, the 8-bit gamma table values for a respective one of said color signals for a selected one of said white color temperatures from said EEPROM, an address input for receiving one of said 8-bit color signals, and an output for supplying the 8-bit gamma table signal.

* * * * *